July 19, 1966  M. KUTS  3,261,246
GASKET CUTTING MACHINE
Filed May 25, 1964  3 Sheets-Sheet 1
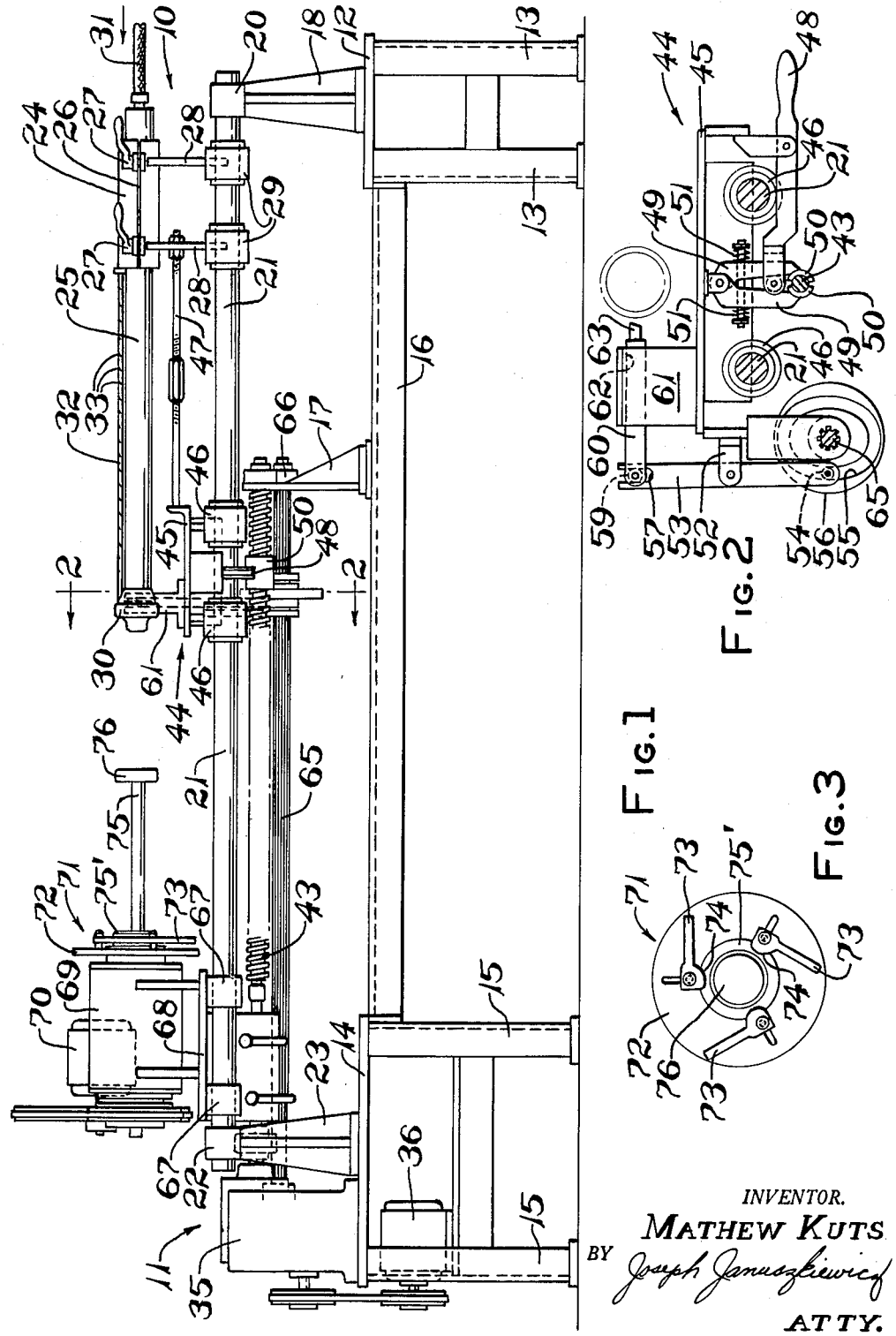
INVENTOR.
MATHEW KUTS
BY Joseph Januszkiewicz
ATTY.

INVENTOR.
MATHEW KUTS
BY Joseph Januszkiewicz
ATTY.

July 19, 1966 M. KUTS 3,261,246
GASKET CUTTING MACHINE
Filed May 25, 1964 3 Sheets-Sheet 3

INVENTOR.
MATHEW KUTS
BY Joseph Januszkiewicz
ATTY.

United States Patent Office 3,261,246
Patented July 19, 1966

3,261,246
GASKET CUTTING MACHINE
Mathew Kuts, Akron, Ohio, assignor to The B. F. Goodrich Company, New York, N.Y., a corporation of New York
Filed May 25, 1964, Ser. No. 370,007
11 Claims. (Cl. 82—101)

This invention relates to rubber cutting machines and more particularly to an apparatus for cutting rings or gaskets from a tube or sleeve of rubber, or like yieldable material.

In the cutting of gaskets from a tube or sleeve of rubber, the sleeve was mounted on a mandrel such as shown in U.S. Patent 2,521,003 after which the mandrel and tube where mounted between a chuck and tailstock for rotation. Simultaneously with such rotation, a cutter adapted to travel lengthwise of the tube would move into and out of engagement with the tube, such as shown by U.S. Patent 2,109,786, while lubricant was used to facilitate cutting whereby a transverse cut was made. One difficulty with such operation would be the distortion caused when the cutter penetrated the sleeve causing variations in thickness and rough cutting.

By means of the present invention, one end of the sleeve is held in a rotating chuck while the other end to be cut is supported by a movable support which cooperates with a movable cutter and conveying means to facilitate severance of the gasket and its immediate removal from the zone of cut thereby assuring a cut gasket free of distortion. In addition, such apparatus separates the cut gaskets during the machining operations preparatory for further handling. Gaskets produced by such apparatus did not need lubricant for the machining operation and were held to closer tolerances than heretofore possible.

It is an object of this invention to provide a new and improved gasket cutting machine which produces smoothly and evenly severed gaskets of a desired thickness with uniformity of operation.

A further object of this invention is to provide a gasket cutting machine which produces gaskets without distortion.

Another object of this invention is to more efficiently cut gaskets from tubular stock.

A further object of this invention is to provide a more efficient means for cutting and handling cut gaskets.

Figure 4:
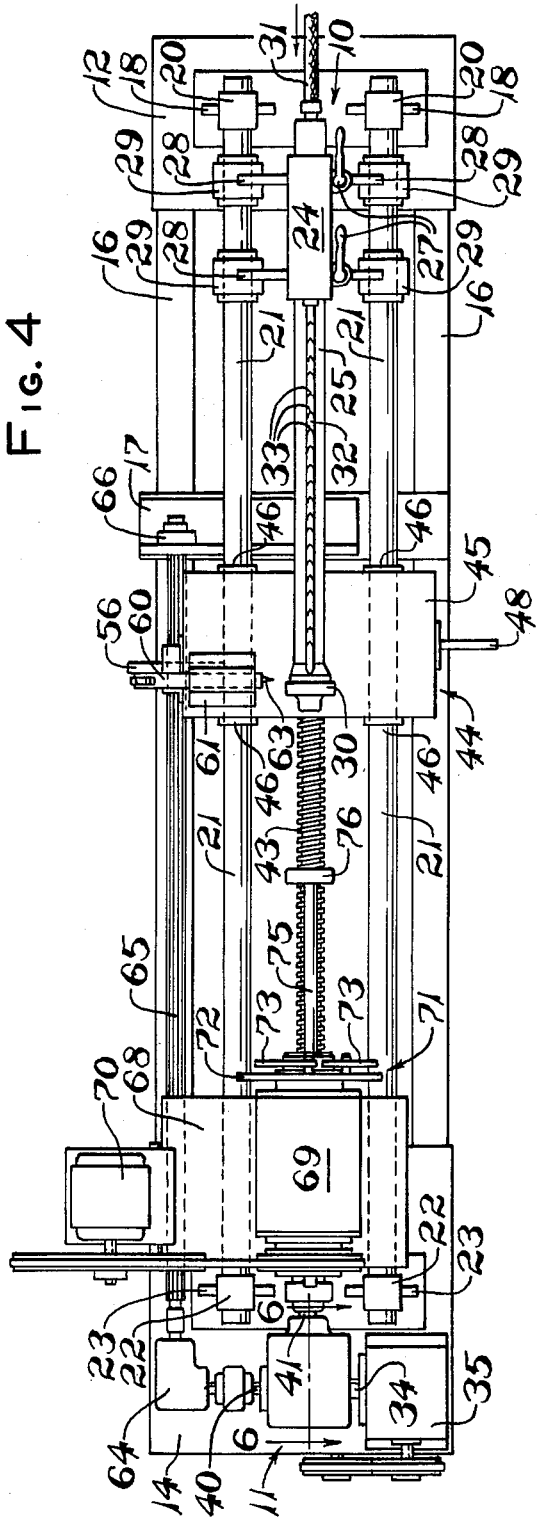
Figure 6:
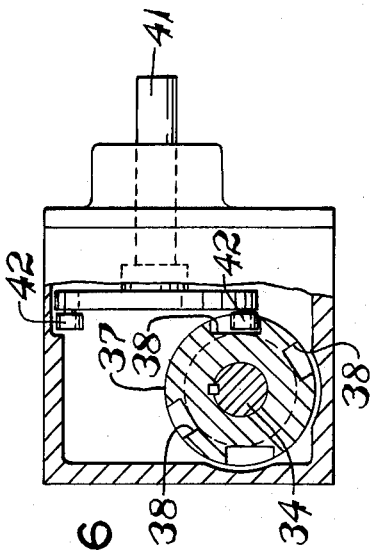
Figure 5:
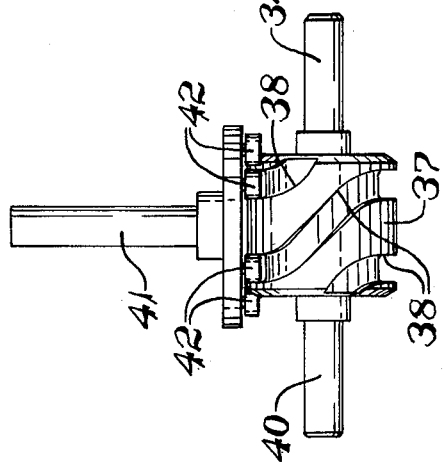
Figure 8:
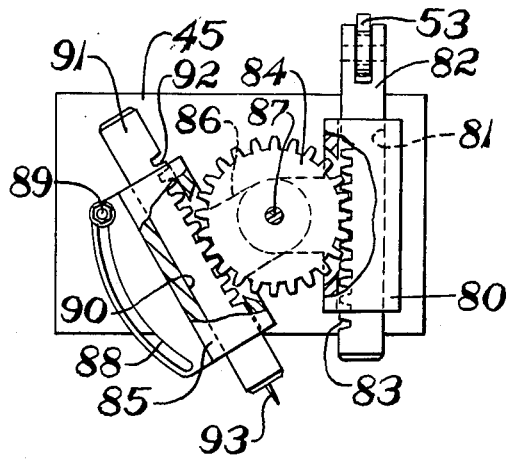
Figure 9:
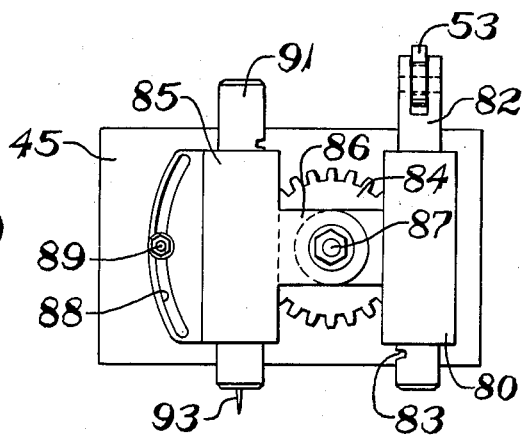
Figure 7:
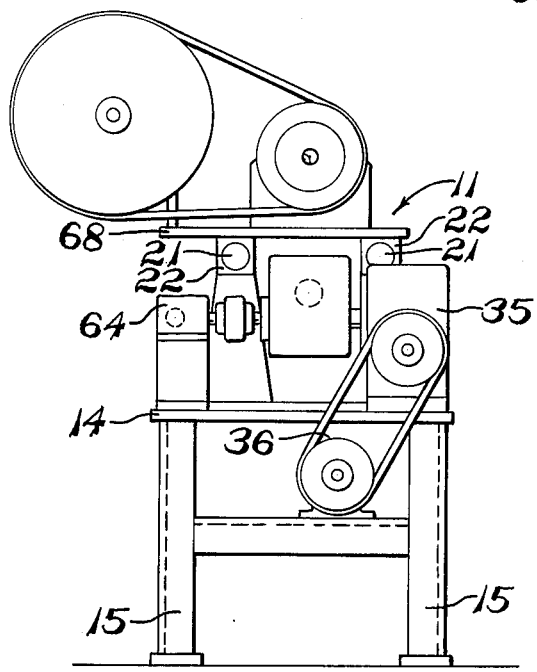

With these and other objects in view, as will hereinafter more fully appear, and which will be more particularly pointed out in the appended claims, reference is now made to the following description taken in connection with the accompanying drawings in which:

FIG. 1 is a side view of the gasket cutting machine.
FIG. 2 is a front elevational view of the carriage and cross slide of the gasket cutting machine taken along line 2—2 of FIG. 1.
FIG. 3 is a front view of the chuck means.
FIG. 4 is a plan view of the gasket cutting machine.
FIG. 5 is an enlarged plan view of the drive means for the headstock, with portions removed for clarity.
FIG. 6 is an enlarged cross-sectional view of the drive means shown in FIG. 5, taken along line 6—6 of FIG. 4.
FIG. 7 is a front elevational view of the gasket cutting machine shown in FIG. 1.
FIG. 8 is a fragmentary plan view with portions broken away of a modified form of means for reciprocating the gasket cutter slide.
FIG. 9 is a plan view of the cutter silde shown in FIG. 8 in a different adjusted position.

Referring now to the drawings, wherein like reference characters designate like or corresponding parts throughout the several views, there is shown in FIGS. 1 and 4 a tailstock indicated generally as 10 and a headstock indicated generally as 11. Tailstock 10 is supported on a plate member 12 which is secured to vertical supports 13 whereas headstock 11 is supported on a plate member 14 secured to vertical supports 15. Headstock 11 and tailstock 10 are connected by a pair of longitudinally extending ways 16 which ways 16 support a bracket 17. Tailstock 10 includes a pair of vertically extending brackets 18 mounted on plate member 12, which brackets 18 support bosses 20. Each boss 20 supports one end of a longitudinally extending cylindrical rod 21. The other end of each cylindrical rod 21 is supported adjacent the headstock 11 by bosses 22, which bosses 22 are supported by brackets 23 mounted on plate member 14. Tailstock 10 additionally includes a tubular member 24 which slideably receives a longitudinally extending rod 25. Tubular member 24 is slit as at 26 (FIG. 1) and provided with clamping means 27 which permits longitudinal adjustment of the rod 25 therethrough. Tubular member 24 is slideably mounted on the respective rods 21 via brackets 28 connected to bosses 29 which guide the linear movement of the tailstock 10 in a manner to be described.

Rod 25 has a threaded end portion which receives a cap 30. The outer diameter of cap 30 is of such dimension to support the one end of a rubberized sleeve for a purpose to be described. Cap 30 is removable to facilitate the mounting of a cap of suitable diameter to properly support the inside diameter of a sleeve to be cut. Rod 25 has a bore extending the full length thereof and communicating with a conduit 31 which is connected to a suitable fluid pressure source. A longitudinally extending tubular rod 32 mounted above the rod 25 but closely adjacent thereto, extends the full length of the rode 25. Rod 32 has angular slits 33 on the upper surface portions communicating with the interior of such tubular rod 32. Pressurized fluid from the conduit 31 flows into the bore of rod 25 and thence flows upwardly along the forward end portion of rod 25 and into the central bore of tubular rod 32 for flow therethrough, whereby pressurized ffuid escapes through the slits 33 and operates to convey cut gaskets rearwardly on the tubular rod 25 in a manner to be more fully described.

Headstock 11 comprises an input shaft 34 (FIG. 5) driven from a transmission 35 which receives its power from a motor 36. Input shaft 34 rotates barrel cam 37, which barrel cam 37 has a plurality of cam grooves 38 and an output shaft 40. Rotation of barrel cam 37 provides an intermittent indexing rotation to a shaft 41 through a plurality of cam followers 42 operatively connecting the cam grooves 38 with the shaft 41. Such action is similar to a Geneva mechanism drive. Shaft 41 rotates lead screw 43 (FIG. 1), which lead screw 43 is adapted to incrementally move a carriage 44 in a longitudinal direction along the rods 21.

Carriage 44 comprises a support plate 45 connected to a plurality of spaced bushings 46, which bushings 46 slideably engage rods 21 to guide the reciprocable movement of carriage 44 thereon. Plate 45 of carriage 44 is connected via a rod 47 to the bracket 28 of tubular member 24 and rod 25 whereby the carriage 44 and rod 25 move linearly as a unit. Support plate 45 pivotally supports a manually operative lever 48 (FIG. 2) which is adapted to operate a pair of spring biased levers 49. One end of each lever 49 is pivotally mounted on support plate 45 while the other end of each lever 49 supports a segment of a half nut 50. The half nuts are adapted to engage lead screw 43. In the normal position of levers 49, springs 51 bias the levers 49 into engagement with the lead screw 43. The one end of lever 48 operates a cam which pivots levers 49 out of engagement with the lead screw 43 to thereby stop the movement of the carriage along the ways 21 in a manner well known in the art. Carriage 44 supports a bracket 52, which bracket 52 pivotally supports the intermediate portion of a vertically extended lever 53. One end of lever 53 has a cam follower 54 which engages a groove 55 on cam 56. Cam 56 is rotatably mounted on a splined shaft to be described for movement thereon while maintaining its rotation with such splined shaft. The other end of lever 53 is slotted as at 57 to receive a cam follower 59 of a tool slide 60. Support plate 45 removably supports a tool block 61 which is grooved as at 62 to slidably receive the tool slide 60, to thereby guide the reciprocable movement of the tool slide. The other end of tool slide 60 supports a tool bit 63 which is adapted to cut the gaskets in a manner to be described.

Output shaft 40 of headstock 11 is connected to a suitable angular drive means 64, which rotates splined shaft 65 (FIG. 4). The other end of splined shaft 65 is journalled in a bearing means 66 on bracket 17. Cam 56, previously referred to, is mounted on splined shaft 65 for rotation therewith such as to impart a reciprocable movement to the tool slide 60. Suitably mounted on rods 21 via support bosses 67 (FIG. 1) and plate member 68 is a transmission means 69 driven by a motor 70. Transmission means 69 drives a chuck 71, which chuck 71 comprises a face plate 72 supporting circumferentially spaced pivot levers 73. Each lever 73 has a cam portion 74 which is adapted to engage the outer peripheral surface of a tubular rubber sleeve to support such sleeve for rotation on the gasket cutting machine. Slideably mounted in the housing of the transmission means 69 is a longitudinally movable rod 75. Rod 75 has a threaded end portion which receives an annular support 76. Annular support 76 is removable to accommodate different sizes of outside diameters whereby the tubular sleeve mounted in the chuck 71 is properly supported.

In the operation of the device, a tubular sleeve made of rubber is slid over the support 76 such that the support 76 supports the intermediate portion of the sleeve while the one end is secured in chuck 71 by pivoting levers 73 such that cam portions 74 engage and support the wall of the sleeve. An annular boss 75' on the face plate may be provided to support the inner wall surface of such a sleeve. Support 76 can be manually adjusted to the desired position to support the intermediate portion of the sleeve. Clamping means 27 is released to permit longitudinal movement of the rod 25 leftward as viewed in FIG. 1 until cap 30 engages the other end portion of the rubber tubular sleeve. Clamping means 27 is then operated to lock the rod 25 to the tubular member 24 whereby rod 25, member 24, rod 47 move as a unit along with carriage 44. Motor 70 is then started to rotate the tubular sleeve mounted between chuck 71 and cap 30. Motor 36 is then energized to initiate the cutting action. Input shaft 34 driven from transmission 35 rotates shaft 40, which in turn rotates splined shaft 65. Cam 56 which is slideably received by splined shaft 65 to permit longitudinal movement is thereby rotated and imparts an oscillating movement to lever 53 which transmits such movement to the tool slide 60 for the transverse cutting action by tool bit 63.

Simultaneously with such cutting action by tool bit 63 and rotation of output shaft 40, shaft 34 imparts an intermittent rotation to shaft 41 (FIG. 5) via barrel cam 37. Such action is similar to a Geneva mechanism which mechanism is well known in the art. Rotation of shaft 41 imparts a similar rotation to lead screw 43 such as to incrementally move carriage 44 in a longitudinal direction along the rods 21. Carriage 45 is moved incrementally only when levers 49 have their half nuts 50 in engagement with the lead screw 43. The rotation of splined shaft 65 is so timed with the intermittent rotation of the lead screw 43 that cam 55 on shaft 65 imparts a transverse cutting action to the cross slide 60 when the lead screw 43 is stationary and a rearward non-cutting action to the cross slide 60 when the lead screw 43 imparts a linear longitudinal movement of the carriage 44.

When a gasket is cut by the tool bit 63 from the workpiece, the gasket is propelled by forced air from the tubular rod 25 such as to convey the cut gasket rightwardly as viewed in FIG. 1. Such action is effected by the flow of pressurized air from a source not shown via conduit 31, through the central bor in rod 25 thence via the slits 33 on rod 32 upwardly and to the right as viewed in FIG. 1 which action propels cut gaskets toward the tailstock 10 thereby removing cut gaskets away from the work area.

A modification of the tool slides is shown in FIGS. 8 and 9. In this embodiment, the plate 45 has a block 80 mounted thereon. Block 80 has a central bore 81 extending therethrough, which bore 81 guides a transmission means 82. Transmission means 82 has a gear rack 83 suitably secured thereto. Rack 83 is adapted to mesh with a gear 84 rotatably journalled on plate 45. A tool holder 85 having a pair of laterally extending brackets 86 pivotally supports such holder 85 for arcuate adjustment about a pivot means 87 which also is the axis of rotation of gear 84. To secure holder 85 against displacement, holder 85 is arcuately slotted as at 88. Slot 88 accommodates a bolt 89 secured to plate 45 whereby tightening of bolt 89 rigidly secures the tool holder 85 in the adjusted position. Holder 85 has a longitudinally extending bore 90 which slideably receives a tool slide 91, which slide 91 has a gear rack 92 secured thereto and meshing with gear 84. Tool slide 91 has a cutter bit 93 secured to the forward end portion.

In the operation of the embodiment shown in FIGS. 8 and 9, the operation is similar in all respects to the original described embodiment except that the tool slide 91 is able to reciprocate at preset angles. Transmission means 82 is reciprocated in the same manner as tool slide 60 by connection to lever 53 and cam 55. Transmission means 82 oscillates gear 84 via its rack connection 83, and gear 84 in turn reciprocates rack 92 and tool slide 93 to perform the transverse cutting action. The cutting action of tool slide 93 may be angularly adjusted by loosening bolt 89 and pivoting tool holder 85 about pivot means 87 while maintaining engagement between rack 92 and gear 84. Bolt 89 is then tightened to maintain the desired angle of cut whereby a gasket having a circumferentially extending surface has side walls that are angularly disposed relative thereto.

It should be understood, of course, that the foregoing disclosure relates to only preferred embodiments of the invention and that numerous modifications or alterations may be made therein without departing from the spirit and the scope of the invention as set forth in the appended claims.

I claim:

1. A tube cutting machine, comprising spaced end supporting means for supporting an elongated tubular stock having a longitudinal center line, means for releasably clamping one end of the stock, means for rotating said stock, a cutter mounted laterally of the longitudinal center line for transverse movement toward and away from said center line, and means operatively connected to one of said end supporting means and said cutter for incrementally moving said one supporting means and said cutter in a longitudinal direction parallel to said center line in timed relationship to said transverse movement of said cutter whereby said one end supporting means supports the stick closely adjacent the cut made thereon by said cutter.

2. A tube cutting machine as set forth in claim 1 wherein said head stock slideably supports a rod extending along said longitudinal center line, and one end of said rod has an enlarged end portion adapted to support the inside wall surface of a tubular stock to be cut.

3. A tube cutting machine comprising a pair of spaced support means for a tubular stock, means for rotating one of said support means, means operatively connected to the other of said support means for incrementally moving said other support means toward said one support means, cutting means operative in timed relationship to said increment movement of said other support means for moving said cutting means transversely toward and away from the center line that connects said pair of spaced support means, said cutting means operatively connected to said other support means for movement therewith toward said one support means whereby one portion of said other support means is maintained adjacent the edge portion of the tubular stock being cut, and said other support means has conveying means operative to remove a cut gasket from the tubular stock away from said one support means.

4. A tube cutting machine having a chuck mounted on one end of a bed wherein said chuck is adapted to releasably clamp a tubular stock, means for rotating said chuck, support means mounted on the other end of said bed having a longitudinal center line concentric with the axis of rotation of said chuck, a carriage mounted on said bed and movable along said longitudinal center line, a cutting means mounted on said carriage, said cutting means movable transversely toward and away from said center line to cut a gasket from tubular stock held between said chuck and said support means, means operatively connected to said support means and said carriage for moving said support means and said carriage incremently toward said chuck in timed relationship to the transverse movement of said cutting means to maintain one end of said support means closely adjacent said cutting means to receive cut gaskets, and said support means has air conveying means operative to convey a cut gasket away from said chuck to a storage position on said support means.

5. A tube cutting machine having a longitudinally extending bed with a chuck mounted on one end thereof, said chuck releasably clamping one end of a tubular stock, means for rotating said chuck and the tubular stock held thereby, support means mounted on the other end of said bed wherein said support means has a longitudinal center line concentric with the axis of rotation of said chuck and whereby said support means rotatably supports the other end of the tubular stock, a carriage mounted on said bed and movable in a direction along said longitudinal center line, a cutting means mounted on said carriage, said cutting means movable transversely toward and away from said center line to cut a gasket from the tubular stock held between said chuck and said support means, means operatively connected to said support means and said carriage for moving said support means and said carriage incrementally toward said chuck in timed relationship to the transverse movement of said cutting means to maintain one end of said support means closely adjacent said cutting means to maintain support for the other end of the tubular stock and to receive cut gaskets thereon, said support means has air conveying means operative to convey a cut gasket in a direction away from said chuck to a storage position on said support means, and said chuck slideably and rotatably supports a movable shaft having an enlarged end portion adapted to support the interior wall of the tubular stock.

6. A tube cutting machine having a headstock and a tailstock with ways extending therebetween, said headstock having a rotatably driven chuck adapted to releasably clamp one end of a tubular stock, said tailstock sildeably mounted on said ways, a carriage mounted on said ways for movement in a longitudinal direction, a cross slide supported by said carriage for movement transeversely of said longitudinal direction, said cross slide having a cutter bit, means operatively connected to said carriage for moving said carriage incrementally in said longitudinal direction in timed relationship to said transverse movement of said cross slide, said tailstock having a tubular support adapted to support the other end of a tubular stock, and means interconnecting said tailstock and said carriage for simultaneous movement on said ways in said longitudinal direction.

7. A tube cutting machine as set forth in claim 6 wherein said tubular support has a bore extending longitudinally therethrough, a fluid pressure source connected to said bore, a tubular rod mounted closely adjacent the upper surface portion of said tubular support and in longitudinal alignment therewith, said tubular rod being connected to said bore for directing pressurized fluid therethrough, said tubular rod having slits on their upper side portions communicating with the interior passageway of said tubular rod, and said slits being angularly disposed to direct pressurized fluid from said passageway upwardly and horizontally away from said chuck whereby cut gaskets are conveyed away from the cutting zone for storage on said tubular support.

8. A tube cutting machine as set forth in claim 7 wherein said headstock slideably supports a shaft concentric with the axis of rotation of said chuck, said shaft having an enlarged portion adapted to closely receive the tubular stock and support such stock during the machining thereof.

9. A gasket cutting machine comprising a bed with ways extending in a longitudinal direction thereon, a headstock on one end of said bed having a chuck for supporting one end of a tubular stock, a carriage mounted on said ways for reciprocable movement thereon, a tailstock supported on said ways closely adjacent the other end of said bed, said tailstock connected to said carriage for linear movement as a unit on said ways, a cross slide mounted on said carriage for movement in a transverse direction, said cross slide has cutting means thereon, means operatively connected to said cross slide for reciprocating said slide in said transverse direction, said tailstock having a rod for supporting the other end of the tubular stock to be cut, means for rotating said chuck and the tubular stock held by said chuck and said rod, means operatively connected to said carriage for intermittently moving said carriage and tailstock in a longitudinal direction toward said chuck in timed relationship to said transverse movement of said slide, and means on said rod for conveying cut gaskets away from the cutting zone of said cross slide.

10. A gasket cutting machine as set forth in claim 9 wherein said conveying means comprises a shaft with a passageway therein, said shaft has slits extending downwardly at an angle generally toward the axis of rotation of said chuck and in a direction generally toward said chuck, said passageway being connected to a pressure source for directing pressurized fluid therethrough and through said slits having a force component that is upwardly and horizontally away from said chuck.

11. A gasket cutting machine as set forth in claim 10 wherein said cross slide is angularly adjustable about an axis that is normal to the axis of rotation of said chuck and workpiece held thereby.

References Cited by the Examiner

UNITED STATES PATENTS

| | | | |
|---|---|---|---|
| 1,322,843 | 11/1919 | Townsend | 82—101 X |
| 1,345,458 | 7/1920 | Pierce | 82—101 X |
| 1,635,807 | 7/1927 | Amberg | 82—101 X |
| 1,942,986 | 1/1934 | St. John | 82—102 |
| 1,986,587 | 1/1935 | Ludington | 82—101 X |
| 2,109,786 | 3/1938 | Taft | 82—101 X |
| 2,476,530 | 7/1949 | Belada | 82—101 |
| 2,521,003 | 9/1950 | Gitter | 82—101 |

WILLIAM W. DYER, JR., *Primary Examiner.*

H. L. HINSON, *Assistant Examiner.*